Nov. 17, 1964 S. PETERSON 3,157,271
EGG COLLECTION DEVICE
Filed June 4, 1963 3 Sheets-Sheet 1
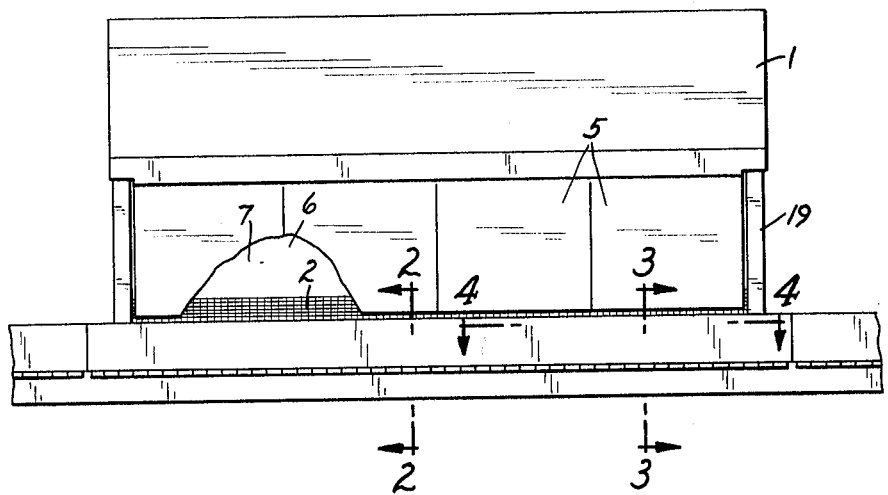
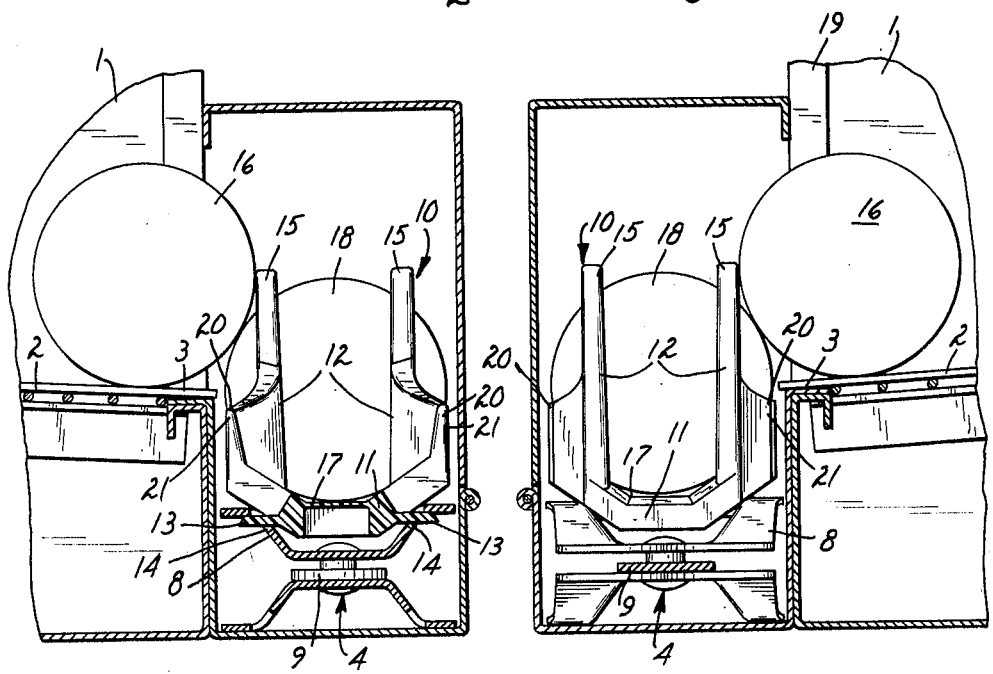
INVENTOR.
SEYMOUR PETERSON
BY
Merchant, Merchant & Gould
ATTORNEYS

INVENTOR.
SEYMOUR PETERSON
BY
ATTORNEYS

Nov. 17, 1964  S. PETERSON  3,157,271
EGG COLLECTION DEVICE
Filed June 4, 1963  3 Sheets-Sheet 3
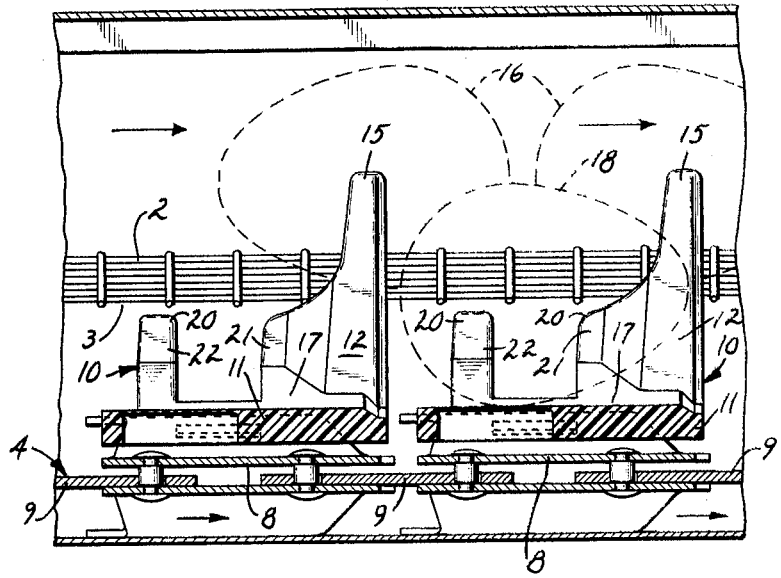
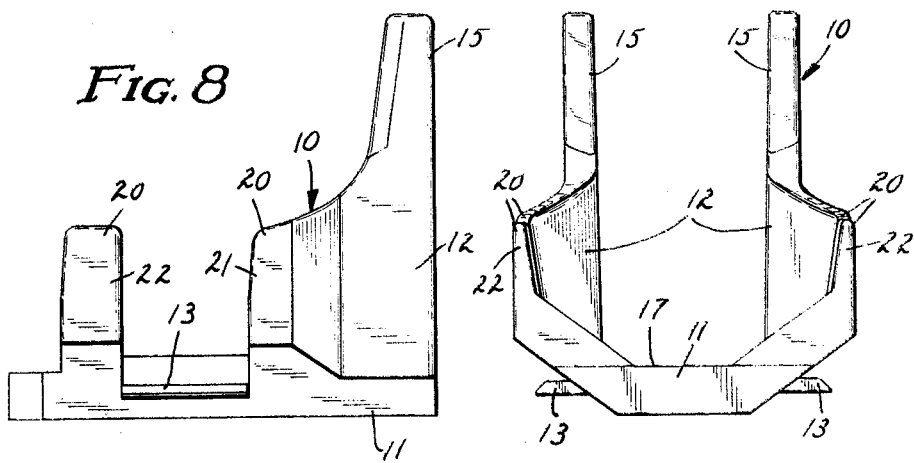
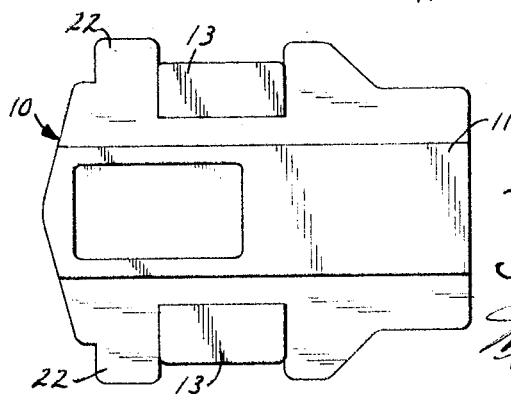
INVENTOR.
SEYMOUR PETERSON
BY
ATTORNEYS

United States Patent Office 3,157,271
Patented Nov. 17, 1964

3,157,271
EGG COLLECTION DEVICE
Seymour Peterson, Dassel, Minn., assignor to Storm Industries, Inc., Dassel, Minn., a corporation of Minnesota
Filed June 4, 1963, Ser. No. 285,390
4 Claims. (Cl. 198—131)

My invention relates to egg collection trays of the type adapted to be secured to a conveyor system in end to end relationship and is in the nature of an improvement upon or modification of the egg collection trays disclosed and claimed in my patent No. 3,042,184.

In conveyor systems of the type under consideration, the nests are provided with inclined bottoms which are slanted downwardly toward a gravity discharge edge, below which is a tray-equipped conveyor system whereby the eggs will automatically roll out of the nests, thence down an inclined ramp or chute and onto the conveyor under the action of gravity. Because of the differences in laying times and of the laying habits of the hens, eggs may be fed by gravity onto the conveyor singly or in such numbers as to cause bunching. The problems which arise by virtue of these facts are two-fold, namely, eggs on the gravity delivery edge of the inclined ramp or chute in an effort to gain entry into a filled tray, frequently become lodged in the space between the trays; secondly, the impact between eggs upon said delivery edge and an egg within a previously filled tray, may be great. In either event, the resulting breakage of the eggs and the contamination caused thereby is highly objectionable and costly.

To overcome the above objectionable features of prior art egg collection systems, my egg collection trays are so designed and arranged in end to end relationship upon the conveyor that it becomes virtually impossible for eggs to become lodged between adjacent filled trays; and a minimum of impact is imparted to the eggs upon the delivery edge of the incline due to passage of filled trays by certain points containing eggs, irrespective of the number of eggs so collected at a given point and the pressure exerted thereby upon the passing trays and the eggs therein.

The primary object of my invention is the provision of an egg collection system including the egg trays which will efficiently collect eggs with a minimum of breakage.

A further object of my invention is the provision of a device of the class immediately above described wherein but a single egg will be permitted to enter the cradles of the individual trays irrespective of the number of eggs at a given point along the path of travel of the conveyor which are seeking entrance thereinto.

A further object of my invention is the provision of a device of the class above described which, by virtue of its particular construction eliminates the danger of eggs on said delivery edge being pushed along by filled trays against obstructions along the path of travel of the conveyor.

A further object of my invention is the provision of an egg tray-equipped conveyor which permits a greater amount of eggs per linear measure to be collected than heretofore found possible, without increasing the rate of damage to the eggs caused by such collection.

A still further object of my invention is the provision of collection trays which are so designed that when placed in end to end relationship on a conveyor system will cause the eggs in individual cradles to be urged into a position wherein the longitudinal dimension of the egg is parallel to the axis of the path of travel of the conveyor whereby to minimize damage and to facilitate removal.

A further object of my invention is the provision of egg trays of the class above described which reduce to a minimum the destruction or deterioration by rodents.

A further object of my invention is the provision of egg trays of the type immediately above described which may be inexpensively molded from sturdy but flexible material, such as polyethylene.

A further object of my invention is the provision of egg trays of the class above described which are designed to minimize accumulation of foreign matter and which may be readily and efficiently cleaned.

The above and still further objects of my invention will become apparent from the following detailed specification, appended claims and attached drawings.

Referring to the drawings, wherein like characters indicate like parts throughout the several views:

FIG. 1 is a view in front elevation of a conveyor system, some parts being broken away;

FIG. 2 is a greatly enlarged view in vertical section taken on the line 2—2 of FIG. 1;

FIG. 3 is a view in vertical section taken on the line 3—3 of FIG. 1, and on the same scale as FIG. 2;

FIG. 7 is a view in vertical section as seen from the line 7—7 of FIG. 5 on an enlarged scale;

FIG. 8 is an enlarged view in side elevation of my novel egg tray removed from the conveyor;

FIG. 9 is a view in rear elevation of the structure of FIG. 8;

FIG. 10 is a view in bottom plan of the structure of FIGS. 8 and 9; and

Figure 4:
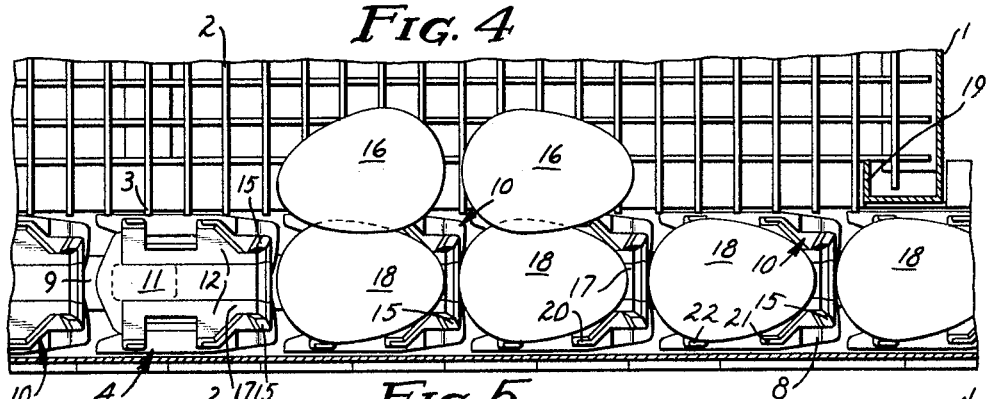
FIGS. 4, 5 and 6 are horizontal sectional views taken on the line 4—4 of FIG. 1, and illustrating the progressive position of eggs being collected from the delivery edge of an inclined floor.
Figure 5:
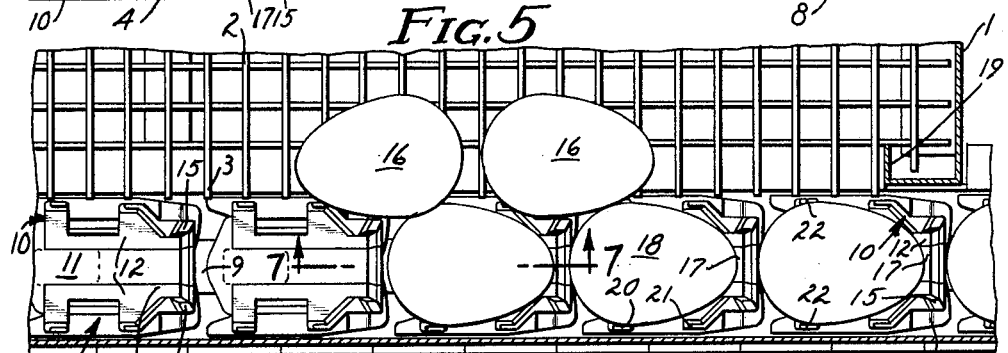

Referring with greater particularity to the drawings, a multiple roll-away nest of conventional design is shown as being provided with a forwardly and downwardly inclined nest-forming floor or bottom wall 2, the delivery edge 3 of which terminates in closely spaced relation to, but above the level of a conveyor, identified in its entirety by 4. The flaps 5 across the open front 6 of the nest are readily displaceable by the chickens entering and leaving the enclosure 7 defined by the nest. Conveyor 4 is generally similar to that shown in my Patent 3,042,-184 and, consequently will not here be explained in detail. It suffices to state that same comprises a plurality of articulated links 8 flexibly connected by elongated fastening bars 9. It will be noted that the path of travel of the conveyor 4 is parallel to the delivery edge 3 of the bottom wall 2.

My novel egg collection trays 10 are molded from relatively tough, durable elastomeric material, such as polyethylene, so as to resist to a maximum extent attacks by rodents. The nature of this material assures a minimum of breakage due to contact of the trays with the eggs being collected and handled. The horizontal base portions of the trays 10 are identified by 11 and the pair of laterally spaced upstanding cradle-forming skirted finger means, which are disposed longitudinally on each tray and on opposite sides thereof, by the numeral 12. Base 11 is formed to provide integral anchoring ears 13 which project laterally outwardly in opposite directions and which are adapted to be detachably received in slotted apertures 14 formed in the intermediate portion of the links 8 with which they interlock.

While it is immaterial in which direction the conveyor 4 is caused to travel in its closely spaced parallel relationship to the delivery edge 3 of the inclined floor 2, I have shown in the drawings, for purposes of illustration, movement of said conveyor 4 from left to right, as indicated by arrows in FIG. 7. As above indicated, the base 11 of my novel trays 10 is below the level of the delivery edge 3 of the inclined floor 2. The laterally spaced upstanding barrier elements 15 formed on the leading ends of each of the finger means 12 project upwardly above the delivery edge 3 a distance approximating the maximum radius of the larger sized eggs 16 receivable in the cradles 17 defined by the bases 11 and the longitudinally joined skirts of the finger means 12 of each of the trays 10. This arrangement prohibits even the larger diameter eggs from becoming lodged between the several trays 10, when in end to end operative relationship upon the conveyor 4. Obviously, when the trays 10 are arranged in such relationship, the upstanding barrier elements 15 of each tray prevents eggs 16 from becoming lodged between the forward end of its respective tray and the rearward end of the immediately preceding tray. Furthermore, the lateral spacing between any given upstanding barrier element 15 and an adjacent delivery edge 3 is such that a minimum of lateral rolling displacement will be imparted to any egg 16 on such delivery edge 3 as said egg 16 comes out of brushing engagement with each succeeding barrier element 15 and comes into brushing engagement with an egg 18 in the cradle 17 of a filled tray 10. In this regard see particularly FIGS. 2 and 3. This spacing is very critical and is largely responsible for the material reduction in breakage resulting from the use of my novel trays 10. It substantiallly eliminates such engagement by either of the eggs 16 on the delivery edge 3 with eggs 18 in the cradle 17, or alternatively, with any part of the passing tray 10 as to carry the eggs 16 along with it to a point of impact with some immovable object such as the end wall 19 of the nest 1. In other words, the accumulated eggs 16 will remain on the delivery edge 3 while making a minimum brushing contact with the passing upstanding barrier means 15 of each of the trays 10, and eggs 18 in the cradles 17 of said trays, until said eggs 16 are permitted to roll laterally into the empty cradle 17 of a passing tray 10. Obviously, the height of the barrier elements 15 could well be decreased somewhat if the upper end portions thereof are moved proportionately in the direction of the delivery edge 3. The important thing is that the barrier elements 15 so engage eggs 16 on the delivery edge 3 as to minimize lateral movement thereof during movement of the conveyor 4 and engagement of said eggs 16 with eggs 18 in the filled cradles 17.

Figure 6:
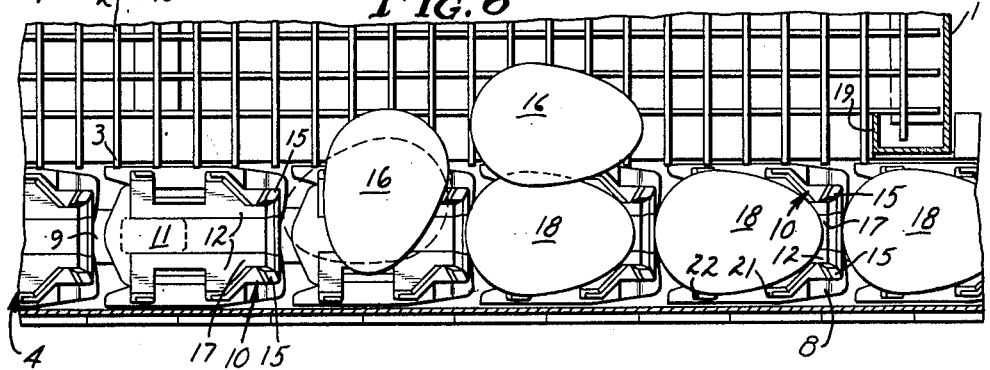
Figure 11:
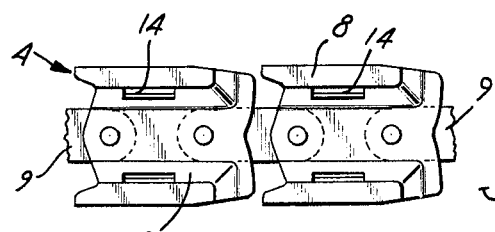
FIG. 11 is a fragmentary view in top plan of the particular conveyor upon which my novel trays are mounted.

It will be noted that the upper limits 20 of the intermediate and rear end portions 21 and 22, respectively, of said skirted finger means 12 terminate below the level of the delivery edge 3 so as to encourage free entrance of the eggs 16 into the cradle 17 under gravity. It may be here stated that because of the minimum frictional engagement of the trays 10, and eggs 18 carried thereby, with the eggs 16 on the delivery edge 3, said eggs 16 are maintained in and permitted to roll into the cradles 17 of a passing empty tray 10, with their horizontal axes extending parallel to the path of travel of the conveyor 4. Obviously, such as arrangement is highly desirable not only in that it eliminates breakage due to contact of laterally projecting eggs 18 with immovable objects, but also in that it facilitates subsequent removal. However, as indicated in FIG. 6 when, under rare circumstances an egg 16 makes entry into a given crade 17 with the axis of said egg 16 angularly disposed with respect to the path of travel of the conveyor 4, brushing engagement thereof with another egg 16 on the delivery edge 3 will tend to straighten the misaligned egg into its desired longitudinal position. The shape and contour of the respective cradles 17 which is substantially boat shape in cross section, is formed by the longitudinally joined laterally spaced skirted side means 12 which shape is not only to maintain eggs 18 in said desired alignment, but also to facilitate the straightening out of misaligned eggs to said desired position. More specifically to the above, it will be noted that the laterally spaced longitudinally disposed skirted finger means of each of the trays 10 diverge rearwardly, downwardly and outwardly from the relatively high barrier elements 15, at which point they are spaced apart a distance slightly greater than the larger diameter eggs 18 to be received within the boat shaped cradles 17. It should here be observed that the longitudinal spacing between the upstanding barrier elements 15 of the immediately adjacent trays 10 is such that the barrier elements 15 of each tray 10 perform a dual function of limiting forward movement of an egg in the cradle 17, of which it forms a part, and of limiting rearward movement of eggs 18 in the cradle 17 of the immediately preceding tray 10. This is due to the spacing between the barrier elements 15 of each tray 10 being a distance less than the maximum diameter of the smallest sized eggs adapted to be collected by the conveyor 4 and trays 10 associated therewith.

It will be noted that the boat shape of the skirted means 12, wherein relatively wide web-like portions are formed in lieu of upstanding narrow fingers of my former Patent 3,042,184, has been found to materially reduce egg breakage as well as deterioration of the trays 10 due to attacks by rodents.

My invention has been thoroughly tested and found to be completely satisfactory for the accomplishment of the above objects, and while I have shown a preferred embodiment thereof, I wish it to be understood that same may be capable of modification without departure from the scope and spirit of the appended claims.

What is claimed is:

1. In an egg collecting system wherein the eggs are gravity fed to a discharge edge and deposited on a moving conveyor, said conveyor comprising a series of articulated link carrying tray members disposed generally parallel to but below said gravity discharge edge adjacent said conveyor, the improvement comprising longitudinally spaced pairs of upstanding skirted cradle forming fingers, a barrier means extending upwardly above said gravity discharge edge adjacent one end of each tray a distance sufficient to engage and hold an egg short of said edge, whereby to cooperate therewith and an egg on said tray to safely prevent passage of said egg to said discharge edge and on to a filled tray therebelow.

2. The device of claim 1, in which the barrier means of adjacent trays are arranged in transversely spaced pairs at the same end of each tray, whereby to restrict forward and rearward movement of an egg in each tray.

3. The device of claim 1, in which each tray member is substantially boat shaped in cross section between the joined sides of the longitudinally spaced pairs of skirted fingers.

4. The device of claim 3, in which the joined sides of skirted fingers are proivded with anchoring ears which detachably interlock each of said trays with its supporting link.

References Cited by the Examiner
UNITED STATES PATENTS
3,042,184  7/62  Peterson _____ 198—131

ERNEST A. FALLER, *Primary Examiner.*
WILLIAM B. LA BORDE, *Examiner.*